United States Patent [19]

Eibner

[11] 4,425,627
[45] Jan. 10, 1984

[54] INTELLIGENT PROMPTING TERMINAL APPARATUS

[75] Inventor: Jules A. Eibner, Blue Bell, Pa.

[73] Assignee: Sperry Corporation, New York, N.Y.

[21] Appl. No.: 237,043

[22] Filed: Feb. 23, 1981

[51] Int. Cl.³ ........................... G06F 1/00; G08C 9/00
[52] U.S. Cl. ............................... 364/900; 340/365 VL
[58] Field of Search ............... 364/900 MS File, 709, 364/710; 340/365 R, 365 VL, 711, 712

[56] References Cited

U.S. PATENT DOCUMENTS

| 4,030,094 | 6/1977 | Anderson | 340/365 VL |
| 4,078,257 | 3/1978 | Bagley | 364/900 |
| 4,333,097 | 6/1982 | Buric et al. | 340/711 |

*Primary Examiner*—Raulfe B. Zache

*Attorney, Agent, or Firm*—John B. Sowell; Thomas J. Scott; Marshall M. Truex

[57] ABSTRACT

An intelligent terminal is provided having a small number of dedicated function keys, a telephone numerical key pad and an elongated visual line display mounted on a small flat terminal housing. Activation of the system causes the associated micro processor in the terminal housing to present a plurality of functions on the line display. Depression of a function key which is opposite one of the functions and dedicated to the key generates a signal indicative of the function key being depressed. The micro processor is programmed to present a different and new set of functions to said line display each time a function key is depressed until a result or answer is finally presented on said line display.

10 Claims, 5 Drawing Figures

INTELLIGENT PROMPTING TERMINAL APPARATUS

BACKGROUND OF THE INVENTION

1. Field of the Invention

The present invention relates to intelligent terminals and more particularly, to an intelligent prompting terminal of the new type which is adapted for use by executives to retrieve information stored in the data processing system and to direct other devices to perform desired functions.

2. Description of the Prior Art

In recent years, intelligent terminals formerly associated with the input and output of a data processing system, have been employed for uses such as banking terminals, computer aided education devices, advanced technology word processors, office system terminals, etc.

The desire to provide a universal intelligent terminal capable of accomplishing the numerous desired functions has driven the price of the intelligent terminals so high as to economically limit the use of intelligent terminals for cost justified applications.

Not only are the newly developed intelligent terminals becoming faster and more versatile in their use applications, but the cost of the electronic logic to perform such functions in the form of micro processors permits the reduction of the hardware cost while increasing the software cost.

As the intelligent terminals become increasingly smart, the keyboard which controls the functions and inputs have also increased in complexity, this is to say that more keys and more functions are required to perform the desired end result. The increase in the number of keys and operations further results in an increase in the cost of the terminals as well as an increase in cost of training personnel to operate the terminal.

There are presently available full keyboard intelligent CRT terminals which have overlay touch panels mounted on a portion of the display tube. Touching the panel and the indicia on the CRT which is visible through the transparent overlay will activate the terminal as if a function key were depressed.

There are also available full keyboard intelligent CRT terminals which present special indicia on a dedicated portion of the CRT. Such CRT's have not only the special indicia but are provided with other indicia making it difficult to isolate the special indicia. The special indicia is adapted to provide a plurality of choices or functions, one of which may be selected by a key on the full keyboard. Such selection keys on the full keyboard are usually placed in remote or isolated position and often provide other functions making eye-hand coordination difficult and slow.

It would be extremely desirable to retain the result functions offered by full keyboard intelligent terminals without increasing the cost and complexity of the intelligent terminal.

SUMMARY OF THE INVENTION

It is a principal object of the present invention to provide a novel intelligent prompting terminal having a small number of function keys without any indicia thereon and which are associated with a portion of a visual line display panel which has portions dedicated to each of the functions keys for indicating the function to be executed.

It is another principal object of the present invention to provide a novel intelligent terminal for executive use which is very small in size and may be connected to a network by a telephone line to provide data and functions of a more complex intelligent data processing system.

It is yet another object of the present invention to provide an intelligent prompting terminal which provides a plurality of function choices, one of which is made by depressing a function key, causing a new set of plurality of function choices to be presented each time a function key is depressed until a desired result is achieved.

It is yet another object of the present invention to provide an intelligent prompting terminal which may be coupled to a voice responsive system by a telephone line.

It is another object of the present invention to provide an intelligent prompting terminal for executive use which is capable of being employed to retrieve data from a system to which it is connected and to supply predetermined alpha numeric data to the system.

It is a general object of the present invention to provide a novel prompting terminal which teaches the user to operate the terminal by asking functional questions, thus, avoiding the necessity of extensive training of the user for use of the keyboard.

According to these and other objects of the present invention there is provided a small compact terminal housing having an associated elongated visual display mounted on top of the housing and having a plurality of function keys each of which are dedicated to a portion of the visual display so that the display and not the function key indicates the function to be associated with the function key to be depressed. Depression of one of the function keys generates signals coupled to a micro processor in the terminal housing and initiates a routine which causes a presentation of a new set of functional choices to be presented on the display panel and associated with the same function keys. The function associated with the function keys is designed to prompt the user to make a series of choices leading to a result function such as presentation of an alpha numeric answer or result which is presented on the same visual display panel. Means are provided for scrolling answers or results to permit the examination of large amounts of stored printed data.

DESCRIPTION OF THE PREFERRED EMBODIMENT

Figure 1:
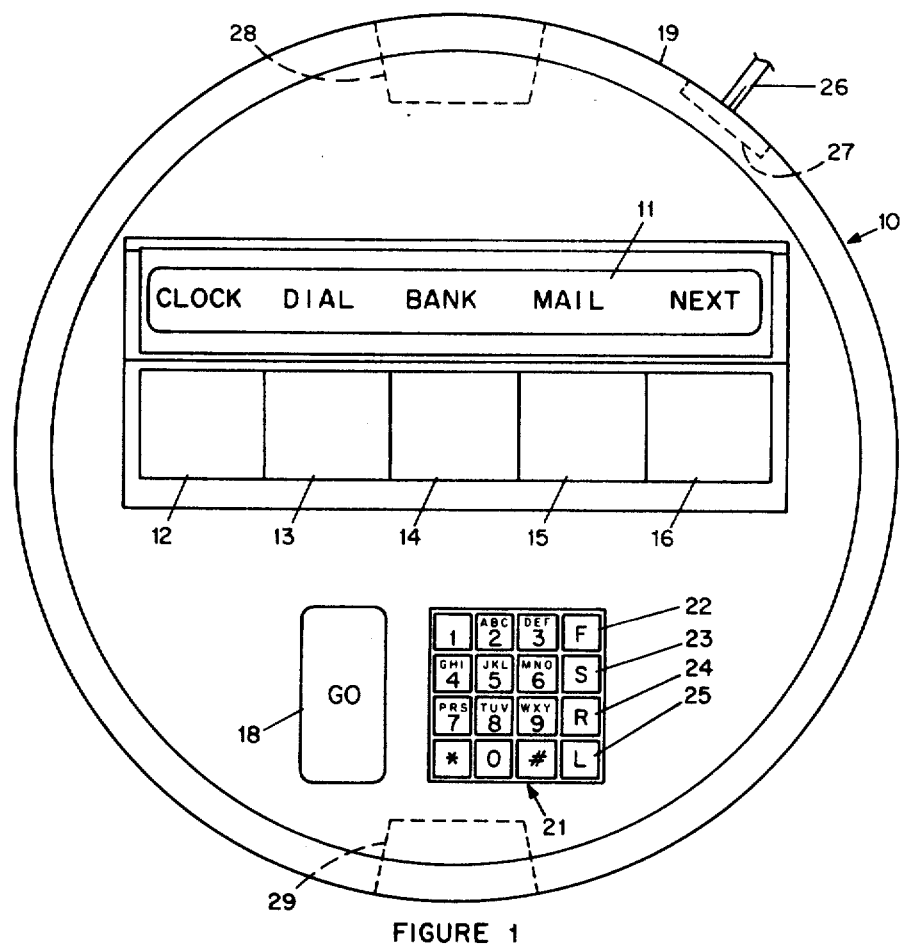
FIG. 1 is a planned view of a preferred embodiment intelligent prompting terminal.
Figure 2:
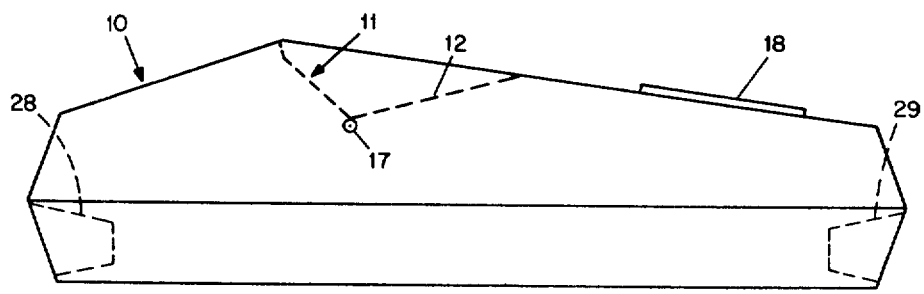
FIG. 2 is a left side view taken in elevation of the terminal of FIG. 1.

Refer now to FIGS. 1 and 2 showing the preferred embodiment intelligent terminal 10. The major portion of the top of the terminal is occupied by the elongated line display panel 11 and the series of function keys 12 to 16. It will be noted that the function keys 12 to 16 are large and easy to operate and can be manipulated with more than one finger. Preferably the function keys are pivoted at one end or the other such as pivot 17 to provide ease of operation. Further, the function keys, such as function key 12 are located adjacent to and directly opposite one of the functions shown on the display panel 11. For example, function key 12 is in front of and directly aligned with the function "CLOCK" as shown in FIG. 1. It has been discovered that using a large key directly associated with a dedicated portion of the display panel completely eliminates decision making and the problem associated with eye-hand coordination. The functions on the display panel of FIG. 1 will be explained in greater detail hereinafter.

In the preferred embodiment mode of operation the intelligent terminal 10 is maintained, powered up and on line. To initialize or begin the operation, a "GO" key 18 is provided. When the "GO" key 18 is depressed, the micro processor inside of the terminal housing 19 will be programmed to start at its initial presentation of functions. The telephone key pad 21 is a standard format telephone key pad having the numerals 0 to 9 asterisk (*) and number (#). Also provided adjacent the telephone key pad 21 are the faster, or F key 22; the slower, or S key 23; the reverse, or R key 24 and the lock, or L key 25 which are used to control scrolling or the speed of presentation of data on the display panel 11.

The intelligent terminal 10 is adapted to be connected to a telephone line 26 through a standard telephone connector 27. Also provided in the terminal housing 19 for telephone use is a speaker 28 and a microphone 29 as shown in phantom lines.

It will be noted from the side view, FIG. 2, that the display panel 11 is a visual line display and is not intended to provide more than two lines of displayed indicia. In the preferred embodiment, a dot matrix crystal display has been provided as a single line capable of presenting thirty-two to eighty characters. Such liquid crystal displays are commercially available from General Electric Company and other manufacturers. While a limited number of characters were provided in the single line visual display 11, other display panels having the capacity for presenting as many characters as necessary to accomodate a line of characters as could be presented on a typed letter or business form could be provided. Further, only five function keys have been shown in the preferred embodiment in order to simplify the explanation of the present invention. It will be understood that larger numbers of function keys could be provided and still be operable easily by the user with a single hand without requiring eye-hand coordination. In the preferred embodiment as will be explained hereinafter, the number of function keys preferably do not exceed eight.

In the preferred embodiment, depression of the "GO" key 18 causes an initial menu of functions to appear on the display panel 11. As one of the function keys 12 to 16 is depressed to make a selection of the choices of functions appearing opposite the function keys, a new set or series of functions will be presented on the display panel 11 and subsequent depressions of function keys will present additional sets of choices of functions on the display panel 11 until a result or answer is presented on the display panel 11 as will be explained hereinafter. Thus, it will be understood that if five successive choices are made by depression of the function keys 12 to 16, as many as 3,125 possible choices could have been presented by employing the novel function keys and associated display panel.

Figure 3:
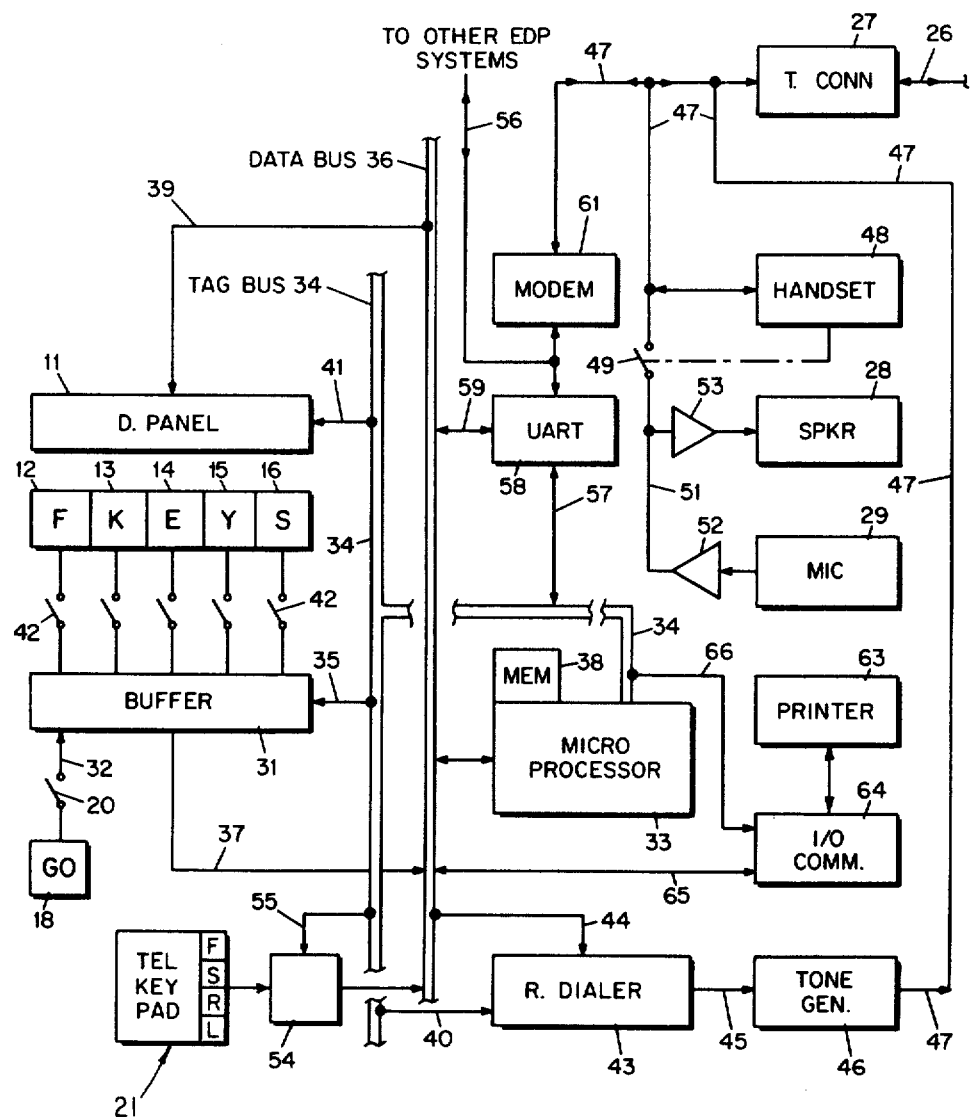
FIG. 3 is a schematic block diagram of the electrical modular components which are mounted in or on the terminal housing.

Refer now to FIG. 3 showing a schematic block diagram of the modular elements which comprise the novel executive prompting terminal. Assume that the "GO" key 18 is depressed to initialize the operation of a routine. The symbolic switch 20 is closed which generates a signal on line 32 to buffer 31. Buffer 31 preferrably comprises a state of the art AND gate logic system having an input on line 32. A signal is also generated at the micro processor 33 which is applied to the tag bus 34 and appears at the buffer 31 via line 35. The signal from the micro processor is basically a scan signal which is periodically produced by the micro processor so that by the time the "GO" key is depressed, the signal from the "GO" key 18 and the buffer 31 is effectively applied to the data bus 36 via line 37. When this occurs, the micro processor 33 recognizes the signal on the data bus from buffer 31 and initializes the routine. A first predetermined menu of choices or functions are generated out of memory 38 and are applied to the data bus 36 and via line 39 to the display panel 11. It will be understood that before the data panel receives the signals via line 39 that a signal has been produced on the tag bus 34 and line 41 to enable the display panel 11. A menu of choices is presented on the display panel 11. In the preferred embodiment there are five choices of functions in the menu and five function keys 12 to 16. The portion of the display panel 11 directly opposite the function keys is indicative of the function or choice which will be made upon depression of a function key 12 to 16. When function key 16 is depressed, the symbolic switch 42 is effectively closed to present a signal to buffer 31. As previously explained, a second input from tag bus 34 on line 35 is being presented to buffer 31 to effectively scan function key 16. The signal on line 37 to data bus 36 informs the micro processor 33 that function key 16 has been depressed and the next menu of choices or functions is presented on the display panel 11. The manner in which the series of displays are presented in response to depression of a particular function key will be explained in greater detail hereinafter.

In normal use of the function keys 12 to 16, some of the functions and choices to appear on the display 11 will permit telephone banking and automatic dialing of telephone numbers by the system via telephone line 26. Depression of a function key 12 to 16 corresponding to a name of a party to be automatically called results in the function on line 37 being sensed at micro processor 33 via data bus 36. As explained hereinbefore, the tag signal on tag bus 34 enables the buffer 31 as well as the repertory dialer 43 via line 40. The number to be dialed automatically is supplied via data bus 36 and line 44 from micro processor 33. The repertory dialer 43 is preferably a commercially chip or module such as a model MK5170 made by Mostek of Carrollton, Tex. Repertory dialer 43 receives address signals and generates data signals on line 45 to tone generator 46, which is also commercially available as a module or chip, such as model MK5089 available from Mostek. The tone generated on line 47 is a standard telephone tone signal which is applied to a standard telephone connector 27 connected to an outside telephone line 26.

After a number is automatically called, a voice response reply may be received on telephone line 26, which may be directed to telephone handset 48 which has a standard telephone speaker and microphone therein. When the handset 48 is picked up and placed in use, switch 49 is open to disable speaker 28 and microphone 29 that are mounted in the terminal housing 19, as explained hereinbefore.

When the handset is not in use, switch 49 is closed and line 51 is operable to transmit voice communication from microphone 29 via amplifier 52 and to receive voice communication from speaker 28 via amplifier 53.

It will be understood that one of the functional choices permits a telephone number to be dialed employing the standard telephone key pad 21 which has its own buffer 54 that is enabled by tag line 55, tag bus 34 and micro processor 33 after the proper function choice has been made by one of the function keys 12 to 16. The output of the telephone key pad 21 is applied to data bus 36 and is subsequently applied to dialer 43 which generates a standard telephone signal from tone generator 46 on line 47.

In the present state of the art, telephone banking systems employ the telephone touchtone signals to transmit data to banking terminals. Initially, control information which is initiated by depression of a function key is generated by the micro processor 33 on data bus 36 to transmit information via line 44 and repertory dialer 43 to the telephone connection 27. When the sequence of operations has proceeded to the point where numerical data entry must be made, the telephone key pad 21 is employed in the touchtone signal mode to generate these data signals as tones on line 47 to be transmitted via line 26 to the remote banking terminal.

In the preferred embodiment system, a micro processor 33 with a self contained memory can be economically utilized. Such a micro processor is commercially available from Intel, Inc. of Calif. as a model 8748 micro processor and from other second source suppliers.

To expand the limited memory of such a self contained micro processor, a larger data base or host system may be utilized without increasing the cost of the executive terminal. Such a data base may be coupled to the present system directly through a line 56 or by a telephone line 26. In the preferred embodiment, the data on data bus 36 could have been connected directly to a host system (not shown) via line 56, however, to simplify this interconnection, a universal asynchronous receiver-transmitter (UART), such as a model TR1863 made by Western Digital Company or an equivalent manufacturer may be economically employed.

Data generated by micro processor 33 is applied to the D bus 36 and via line 59 is available at UART 58. The tag bus 34 and tag line 57 enable UART 58 so that the parallel data on the D bus is converted to serial asynchronous form and presented on line 56 to the host system as well as to modem 61. If the serial data on line 56 is transmitted directly to a host system, it is in proper form for being utilized by the host system communication controller. In the event that the data signals will be transmitted to a remote host system via a telephone line, the modem 61 converts the serial data to frequency shift key (FSK) data on line 47. The frequency shift key data on line 47 is directly connected to the outside telephone line 26 via telephone connector 27 for transmission to a remote host system. It will be appreciated that the present invention system could have employed the micro processor 33 and the repertory dialer 43 to telephone the host system via telephone line 26 before transmitting the data being generated through UART 58 and modem 61 on line 47.

The UART 58, modem 61 and lines 56 and/or 47 carry bidirectional data which can be transmitted simultaneously in both directions. The D bus of the preferred embodiment micro processor 33 is unidirectional, that is to say that data is either being transmitted or received by the micro processor and not both simultaneously.

Figure 4:
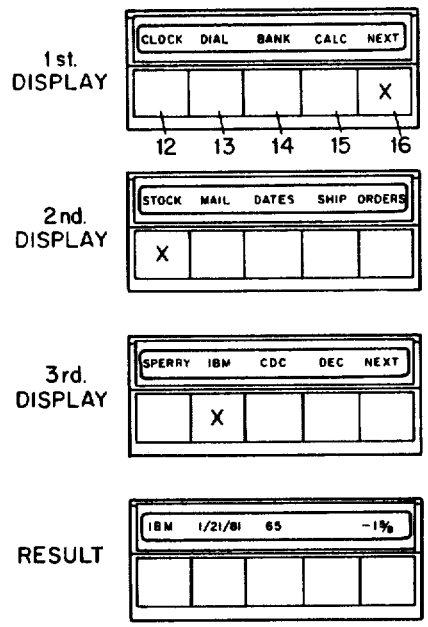
FIG. 4 is a schematic representation of the function keys and display panel on the intelligent terminal showing a representative sequence of operations employed for data retrieval.

Refer now to FIG. 4 showing in pictorial form the display panel 11 and function keys 12 to 16 which will be employed to illustrate an example of data retrieval from a host system. After the depression of the "GO" key 18, the micro processor 33 provides the menu shown in the first display from its memory 38 showing five choices, one of which is "NEXT". The symbolic X on function key 16 illustrates that function key 16 is depressed. In the illustrated embodiment the "NEXT" menu shown on the second display was not obtained from memory 38 but was supplied from a memory in a host system in the following manner. The depression of function key 16 has caused the micro processor 33 to dial the host system via dialer 43 and tone generator 46. The host systems response was frequency shift key data on telephone line 26 and line 47 to modem 61 and was converted in UART 58 to signals that were presented via line 59 to data bus 56. This data supplied to the micro processor 33 was displayed at the second display wherein one of the functional choices was "STOCK". Depression of function key 12 in the second display pictorial representation caused the micro processor 33 to directly communicate to the host system via its data bus 36, line 59, UART 58 and modem 61 as explained hereinbefore. This resulted in data being received via line 47 and the bidirectional systems at micro processor 33 which was processed to provide the third display. The third display provides several representative "STOCKS" one of which is IBM. The depression of function key 13 in the third display pictorial representation causes the micro processor 33 to send information via its data bus 36, line 59, UART 58 and modem 61 to the host system which returns with the proper information for generating the signal shown in the fourth display or result display wherein the stock "IBM" is indicated, the result includes the date on which the stock price is provided, the current price and the change from the close of the previous day. It will be appreciated that this simple example has been selected to illustrate the operation of the present invention system which is capable of obtaining all types of data from the host system such as electronic switched messages, accounting information, factory production data, inventory data and any other type of data including letters which are ordinarily stored in the host data processing systems.

When a printed reproduction of the data being presented at display panel 11 is desired, a remotely located printer 63 may be employed to print out the data. Printer 63 is connected through a standard I/O connector 64 to the data bus 36 via data line 65. In the preferred embodiment system, after a letter has been scanned and read employing the control keys 22 to 25 described hereinbefore, the micro processor 33 will automatically present a new menu including the choices of functions such as "REPEAT", "DESTROY", "STORE", "PRINT", and "NEXT". Depression of the function key opposite "PRINT" will result in the tag bus 34 enabling the I/O connector 64 and printer 63 via tag line 66.

Figure 5:
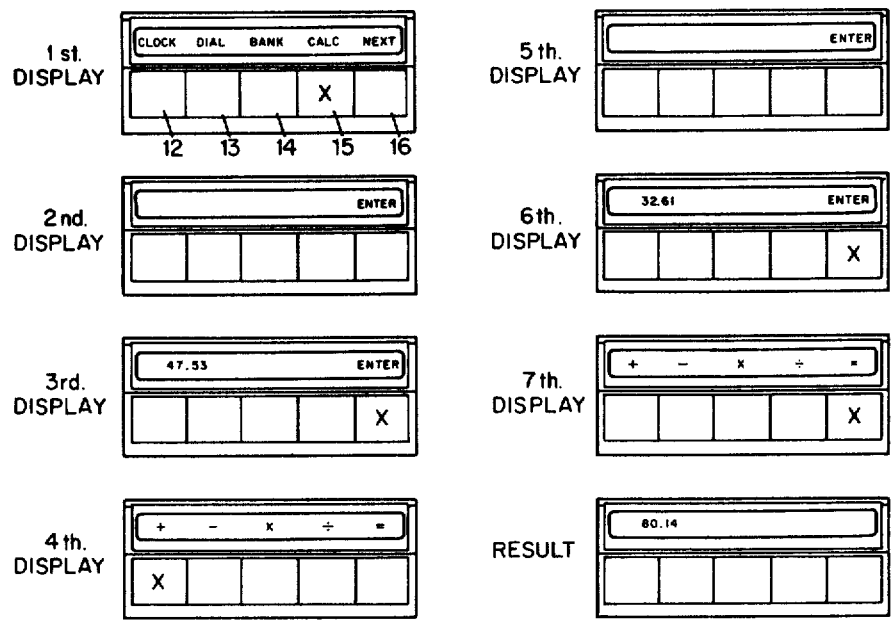
FIG. 5 is a schematic representation of the function keys and display panel on the intelligent terminal showing a representative sequence of operations employed for performing a calculation.

To further illustrate that the present system is capable of performing most of the functions which can be performed by a full keyboard with the exception of typing letters the following example with respect to FIG. 5 is presented. In FIG. 5, the first display in pictorial form provides a function entitled "CALC". Depression of "CALC" key 15 results in the micro processor 33 presenting a second display which is completely blank except for the word "ENTER" at the right hand portion of the display opposite function key 16. The executive operator of the system is now prompted to enter a number, which is shown in the third display as being 47.53, on the display by depression of the proper numbers in the proper sequence on the telephone key pad employing the asterisk for the decimal point. The function "ENTER" on the third display is still present and depression of function key 16 will enter the number on the display so that the micro processor 33 receives this digital information and responds with a new menu shown in the fourth display to be the symbolic alternatives $+$, $-$, $\times$, $\div$ and $=$. For purposes of simplicity, assume that this is an addition operation and the function key 12 is depressed which results in the micro processor 33 sensing the plus ($+$) functional selection and then supplies the same menu shown in the second display in the fifth display. A second number 32.61 is entered as shown in the sixth display and the function key 16 is depressed to enter the number 32.61 as explained before. The entering of this digital data into the micro processor results in the micro processor 33 responding with the same display shown in the fourth display; however, in the seventh display the function key 16 opposite "$=$" is depressed to obtain a result. As shown in the eighth display, the result is now presented on the display as a number 80.14 and no function is provided on the display with this result or answer the number of possible functions programmed into memory 38 increases expotentially with each set of functions and is equal to $K^{n+1}$ where K is the number of function keys and n is the number of key depression choices made.

Having explained a simplified example of data retrieval of information from a host computer and a simplified calculation employing data entry using the telephone key pad, it will be understood that letters and records may be updated as well as read and printed out and a closely located printing station 63. It will be appreciated that such a system will permit an executive to electronically scan mail which is being generated at a remote host computing station coupled via a satellite communications link to the present terminal. As an example, the Sperry Univac, division of Sperry Corporation has host computers located in major cities throughout the United States which are linked together by satellite communication links. The executive with the terminal of the present invention is entitled to access the host computer at his location to receive electronic mail from host computers in other cities of the United States.

Having explained a preferred embodiment, it will be appreciated that an executive can make a voice annotation to the aforementioned piece of electronic mail and forward the letter or mail with his voice annotation to some other person on the same host system. The person receiving the annotated mail may employ same type of terminal when the host system is equipped with voice store and forward capabilities.

I claim:

1. An intelligent prompting terminal comprising:
   terminal housing means,
   elongated visual line display means mounted on said terminal housing means,
   data processing means disposed in said terminal housing means coupled to said visual display means,
   memory means disposed in said terminal housing means coupled to said visual display means via said data processing means for presenting sets of functions for display on said visual display means,
   a plurality of blank function keys mounted on said terminal housing means in close proximity to said visual line display means,
   each said function key being dedicated to a predetermined portion of said visual display means,
   each said function key being aligned with its associated and dedicated portion of said visual display means,
   each said function key being coupled to said data processing means for transmitting signals thereto upon depression of a said function key, whereby said data processing means will respond with a function indicative of the function being displayed on said visual display means opposite said depressed function key and will present a new set of functions on said visual display means opposite said function keys.

2. An intelligent prompting terminal comprising:
   a terminal housing,
   an elongated visual line display mounted on top of said housing,
   a plurality of function keys,
   each said function key being dedicated to a predetermined portion of said visual line display,
   each said function key being mounted on top of said housing in front of its dedicated portion of said visual line display,
   each said function key being without indicia thereon and designed to generate unique function key signals which are indicative of the key being depressed,
   micro processor means in said housing coupled to said function key signals for sensing the depression of a function key and the function displayed on said visual line display,
   memory means in said micro processor means for presenting a first set of functions on said visual line display upon starting the terminal,
   the first depression of a function key opposite one of said displayed functions in said dedicated portion of said visual line display being effective to initiate a predetermined program routine in said micro processor which will present a different set of functions on said visual line display from said memory, and
   each successive depression of a function key of said plurality of function keys being effective to provide a new set of choices of functions on said visual line display, whereby the number of possible function choices increases exponentially with the number of key depression choices made.

3. An intelligent prompting terminal as set forth in claim 2 wherein the last depression of a series of depression of function keys is effective to provide a result in the form of alpha numeric characters to be presented on said visual line display.

4. An intelligent prompting terminal as set forth in claim 3 where said result is a numerical computation carried out by said micro processor.

5. An intelligent prompting terminal as set forth in claim 4 which further includes a telephone numerical key pad adapted to generate signals coupled to the input of said micro processor for entering numerical data to be processing by said micro processor according to the function entered by said function key.

6. An intelligent prompting terminal as set forth in claim 3 which further includes a plurality of control keys coupled to said micro processor for controlling the rate of change of a plurality of lines of alpha numeric characters forming a result.

7. An intelligent prompting terminal as set forth in claim 3 which further includes a universal asynchronous receiver-transmitter coupled to said micro processor, and a telephone modem coupled to said universal asynchronous receiver-transmitter for converting micro processor parallel output signals to telephone line series signals to enable said intelligent prompting terminal to communicate with other data processing systems.

8. An intelligent prompting terminal as set forth in claim 7 which further includes a telephone numerical key pad coupled to the input of said micro processor for entering numerical data to be processed by said micro processor, and
 a repertory dialer in series with a tone generator coupled to said telephone numerical key pads and to said micro processor for generating telephone tone signals, and
 a telephone line connector in said terminal housing coupled to said tone generator for receiving a telephone line.

9. An intelligent terminal as set forth in claim 8 which further includes a speaker and a microphone in said terminal housing connected to said telephone line connector.

10. An intelligent prompting terminal comprising:
 a terminal housing,
 an elongated visual line display mounted on top of said housing,
 a plurality of function keys on said housing,
 each said function key being dedicated to a predetermined portion of said visual line display,
 each said function key being mounted on top of said housing adjacent to and in front of said dedicated portion of said visual line display,
 each said function key being designed to generate unique function key signals which are indicative of the function key being depressed,
 micro processor means in said housing coupled to said function key signals and to said visual line display,
 memory means in said micro processor means adapted to present a first set of functions on said visual line display, and
 the first depression of a function key opposite one of said displayed functions in said dedicated portion of said visual line display being effective to initiate a predetermined program routine in said micro processor which will present a different set of functions on said visual line display from said memory, whereby each subsequent depression of a new function key of said plurality of function keys will provide a new set of choices of functions which prompt the terminal user to continue making function choices until an answer or result is displayed on said visual display panel instead of a set of functions.

* * * * *